US008592351B2

(12) United States Patent
Kaminsky

(10) Patent No.: US 8,592,351 B2
(45) **Date of Patent: *Nov. 26, 2013**

(54) ENHANCING EMULSION STABILITY

(75) Inventor: Robert D. Kaminsky, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 251 days.

This patent is subject to a terminal disclaimer.

(21) Appl. No.: 12/919,175

(22) PCT Filed: Feb. 11, 2009

(86) PCT No.: PCT/US2009/033813

§ 371 (c)(1), (2), (4) Date: Aug. 24, 2010

(87) PCT Pub. No.: WO2009/117192

PCT Pub. Date: Sep. 24, 2009

(65) Prior Publication Data

US 2011/0024128 A1 Feb. 3, 2011

Related U.S. Application Data

(60) Provisional application No. 61/070,133, filed on Mar. 20, 2008.

(51) Int. Cl.

| | |
|---|---|
| ***C09K 8/68*** | (2006.01) |
| ***C09K 8/60*** | (2006.01) |
| ***E21B 43/00*** | (2006.01) |
| ***E21B 43/16*** | (2006.01) |

(52) U.S. Cl.

USPC ........... 507/203; 507/200; 507/202; 507/904; 507/937; 166/266; 166/275; 166/369

(58) Field of Classification Search

USPC .......... 166/369, 266, 275; 507/200, 202, 203, 507/904, 937

See application file for complete search history.

(56) References Cited

U.S. PATENT DOCUMENTS

| | | | |
|---|---|---|---|
| 3,149,669 | A | 9/1964 | Binder et al. |
| 4,077,931 | A | 3/1978 | Leitheiser et al. |

(Continued)

FOREIGN PATENT DOCUMENTS

| | | |
|---|---|---|
| CA | 940853 | 1/1974 |
| CA | 2075108 | 1/1994 |

(Continued)

OTHER PUBLICATIONS

M. Fiori, et al., Optimal Emulsion Design for the Recovery of a Saskatchewan Crude, Mar.-Apr. 1991, Journal of Canadian Petroleum Technology, 30(2), pp. 123-132.

(Continued)

*Primary Examiner* — Aiqun Li

(74) *Attorney, Agent, or Firm* — ExxonMobil Upstream Research Company-Law Department

(57) ABSTRACT

The present invention is directed to methods and apparatuses for generating an emulsion with enhanced stability. The methods include forming a stressed emulsion fluid using a high-shear mixer and stressing the emulsion by microporous flow, aging, heating, or another process, and reshearing the stressed emulsion fluid. The process may be repeated for enhanced stability. In some embodiments the generated emulsion may be used in hydrocarbon recovery operations. Optionally, the emulsion may include surfactants or solid microparticles for additional stability enhancement.

36 Claims, 9 Drawing Sheets

(56) References Cited

U.S. PATENT DOCUMENTS

| | | | |
|---|---|---|---|
| 4,232,739 | A | 11/1980 | Franklin |
| 4,676,889 | A | 6/1987 | Hsieh et al. |
| 4,908,154 | A | 3/1990 | Cook et al. |
| 4,966,235 | A | 10/1990 | Gregoli et al. |
| 4,983,319 | A | 1/1991 | Gregoli et al. |
| 5,236,577 | A | 8/1993 | Tipman et al. |
| 5,274,572 | A | 12/1993 | O'Neill et al. |
| 5,781,430 | A | 7/1998 | Tsai |
| 5,855,243 | A | 1/1999 | Bragg |
| 5,876,592 | A | 3/1999 | Tipman et al. |
| 5,910,467 | A | 6/1999 | Bragg |
| 5,913,022 | A | 6/1999 | Tinaztepe et al. |
| 5,920,718 | A | 7/1999 | Uczekaj et al. |
| 5,927,404 | A | 7/1999 | Bragg |
| 5,968,349 | A | 10/1999 | Duyvesteyn et al. |
| 6,007,709 | A | 12/1999 | Duyvesteyn et al. |
| 6,028,819 | A | 2/2000 | Mullarkey et al. |
| 6,068,054 | A | 5/2000 | Bragg |
| 6,074,558 | A | 6/2000 | Duyvesteyn et al. |
| 6,182,014 | B1 | 1/2001 | Kenyon et al. |
| 6,191,787 | B1 | 2/2001 | Lu et al. |
| 6,195,092 | B1 | 2/2001 | Dhond et al. |
| 6,214,213 | B1 | 4/2001 | Tipman et al. |
| 6,323,679 | B1 | 11/2001 | Robertson et al. |
| 6,358,403 | B1 | 3/2002 | Brown et al. |
| 6,358,404 | B1 | 3/2002 | Brown et al. |
| 6,374,252 | B1 | 4/2002 | Althoff et al. |
| 6,401,081 | B1 | 6/2002 | Montgomery et al. |
| 6,411,922 | B1 | 6/2002 | Clark et al. |
| 6,498,988 | B1 | 12/2002 | Robert et al. |
| 6,678,642 | B1 | 1/2004 | Budge |
| 6,712,215 | B2 | 3/2004 | Scheybeler |
| 6,731,994 | B2 | 5/2004 | Heching et al. |
| 6,731,998 | B2 | 5/2004 | Walser et al. |
| 6,800,116 | B2 | 10/2004 | Stevens et al. |
| 6,829,570 | B1 | 12/2004 | Thambynayagam et al. |
| 6,910,001 | B2 | 6/2005 | Hammersley et al. |
| 6,934,931 | B2 | 8/2005 | Plumer et al. |
| 6,951,891 | B2 | 10/2005 | Baltussen et al. |
| 6,980,935 | B2 | 12/2005 | Lu et al. |
| 6,980,940 | B1 | 12/2005 | Gurpinar et al. |
| 6,996,803 | B2 | 2/2006 | Sakamoto et al. |
| 7,067,811 | B2 | 6/2006 | Long et al. |
| 7,141,162 | B2 | 11/2006 | Garner et al. |
| 7,296,274 | B2 | 11/2007 | Cohen et al. |
| 7,376,472 | B2 | 5/2008 | Wojsznis et al. |
| 7,451,066 | B2 | 11/2008 | Edwards et al. |
| 7,478,024 | B2 | 1/2009 | Gurpinar et al. |
| 7,499,841 | B2 | 3/2009 | Hoffman |
| 7,516,446 | B2 | 4/2009 | Choi et al. |
| 7,546,578 | B2 | 6/2009 | Yang |
| 2003/0018490 | A1 | 1/2003 | Magers et al. |
| 2003/0125818 | A1 | 7/2003 | Johnson |
| 2003/0139907 | A1 | 7/2003 | McCarthy |
| 2004/0054564 | A1 | 3/2004 | Fonseca et al. |
| 2004/0111428 | A1 | 6/2004 | Rajan et al. |
| 2005/0027559 | A1 | 2/2005 | Rajan et al. |
| 2005/0150844 | A1 | 7/2005 | Hyndman et al. |
| 2005/0263437 | A1 | 12/2005 | Howdeshell |
| 2006/0111903 | A1 | 5/2006 | Kemmochi et al. |
| 2006/0113218 | A1 | 6/2006 | Hart et al. |
| 2006/0138036 | A1 | 6/2006 | Garner et al. |
| 2006/0138055 | A1 | 6/2006 | Garner et al. |
| 2006/0196812 | A1 | 9/2006 | Beetge et al. |
| 2006/0249439 | A1 | 11/2006 | Garner et al. |
| 2006/0260980 | A1 | 11/2006 | Yeung |
| 2006/0282243 | A1 | 12/2006 | Childs et al. |
| 2007/0156377 | A1 | 7/2007 | Gurpinar et al. |
| 2007/0168057 | A1 | 7/2007 | Blevins et al. |
| 2007/0168741 | A1 | 7/2007 | Chadha et al. |
| 2008/0208552 | A1 | 8/2008 | Kumar et al. |
| 2008/0288226 | A1 | 11/2008 | Gurpinar et al. |

FOREIGN PATENT DOCUMENTS

| | | |
|---|---|---|
| CA | 2200899 | 9/1998 |
| CA | 2232929 | 9/1998 |
| CA | 2353109 | 1/2003 |
| CA | 2502943 | 5/2004 |
| CA | 2505411 | 7/2004 |
| CA | 2425840 | 10/2004 |
| CA | 2435113 | 1/2005 |
| CA | 2493677 | 6/2005 |
| CA | 2455011 | 7/2005 |
| CA | 2490734 | 6/2006 |
| CA | 2502329 | 9/2006 |
| CA | 2521248 | 3/2007 |
| EP | 1338330 | 8/2003 |
| GB | 1365332 | 10/1971 |
| WO | WO 99/33936 | 7/1999 |

OTHER PUBLICATIONS

C. Mabille, et al., Rheological and Shearing Conditions for the Preparation of Monodisperse Emulsions, 2000, Langmuir, vol. 16, pp. 422-429.

T.G. Mason, et al., Shear Rupturing of Droplets in Complex Fluids, 1997, Langmuir, vol. 13, pp. 4600-4613.

H. Mendoza, et al., Effect of Injection Rate on Emulsion Flooding for a Canadian and a Venezuelan Crude Oil, 1991 Technical Conference (Banff, Alberta), Petroleum Society of CIM and AOSTRA, Paper 91-26.

ENHANCING EMULSION STABILITY

CROSS-REFERENCE TO RELATED APPLICATION

This application is the National Stage of International Application No. PCT/US2009/033813, filed 11 Feb. 2009, which claims the benefit of U.S. Provisional Application No. 61/070,133, filed Mar. 20, 2008.

Co-pending application Ser. No. 12/919,700 entitled "Viscous Oil Recovery Using Emulsions," and claiming priority to U.S. Provisional Application No. 61/070,156 filed on Mar. 20, 2008 shares a priority date, an inventor, is assigned to the same entity, and may include subject matter related to the present application.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Emulsions, both oil-in-water (o/w) and water-in-oil (w/o), are commonly used in a range of applications, for example, foods, paints, cosmetics, lotions, and medications. The stability of such emulsions to shearing and aging can be critical to the performance of the products and their shelf life. An emulsion with poor stability may result in the rupture of the internal-phase droplets, thus forming a free phase. Free phase formation can reduce the texture and effectiveness of the product. Emulsion stability is typically enhanced by use of surface-active additives (e.g., surfactants). However, in certain cases it is desirable to utilize little or no additives to reduce cost or to avoid interference with other properties of the desired emulsion.

One useful application of emulsions is in the recovery of hydrocarbons from subterranean formations. Oil recovery is usually inefficient in subterranean formations (hereafter simply referred to as formations) where the mobility of the in situ oil being recovered is significantly less than that of the drive fluid used to displace the oil. Mobility of a fluid phase in a formation is defined by the ratio of the fluid's relative permeability to its viscosity. For example, when waterflooding is applied to displace very viscous heavy oil from a formation, the process is highly inefficient because the mobility of the viscous oil is much lower than the mobility of the water. The water quickly channels through the formation to the producing well, bypassing most of the oil and leaving it unrecovered. Consequently, there is a need to either make the water more viscous, or use another drive fluid that will not channel through the oil. Because of the large volumes of drive fluid needed, it must be inexpensive and stable under formation flow conditions. Oil displacement is most efficient when the mobility of the drive fluid is less than the mobility of the oil, so the greatest need is for a method of generating a low-mobility drive fluid in a cost-effective manner.

For modestly viscous oils—those having viscosities of approximately 10-300 centipoise (cp) water-soluble polymers such as polyacrylamides or xanthan gum have been used to increase the viscosity of the water injected to displace oil from the formation in a waterflooding operation. In this process, the polymer is dissolved in the water, increasing its viscosity. While such water-soluble polymers can be used to achieve a favorable mobility, it is not generally viable for higher viscosity oils (e.g., above 300 cp). These oils are so viscous that the amount of polymer needed to achieve a favorable mobility ratio would usually be uneconomic. Further, polymer dissolved in water often is adsorbed from the drive water onto surfaces of the formation rock, entrapping it and rendering it ineffective for viscosifying the water. This leads to loss of mobility control, poor oil recovery, and high polymer costs. For these reasons, use of polymer floods to recover oils in excess of about 300 cp is not usually economically feasible. Also, performance of many polymers is adversely affected by levels of dissolved ions typically found in formation brine, placing limitations on their use and/or effectiveness.

Water-in-oil macroemulsions (hereafter referred to simply as "emulsions" or "w/o emulsions") have been proposed as a method for producing viscous drive fluids that can maintain effective mobility control while displacing moderately viscous oils. For example, the use of water-in-oil and oil-in-water macroemulsions have been evaluated as drive fluids to improve oil recovery of viscous oils. Although generally not discussed herein, microemulsions (i.e., thermodynamically stable emulsions) have also been proposed as flooding agents for hydrocarbon recovery from reservoirs, which may also be referred to as "emulsion flooding."

Macroemulsions used for hydrocarbon recovery have been created by addition of sodium hydroxide to acidic crude oils from Canada and Venezuela. See, e.g., H. Mendoza, S. Thomas, and S. M. Farouq Ali, "Effect of Injection Rate on Emulsion Flooding for a Canadian and a Venezuelan Crude Oil", Petroleum Society of CIM and AOSTRA 1991 Technical Conference (Banff, Alberta), Paper 91-26; and M. Fiori and S. M. Farouq Ali, "Optimal emulsion design for the recovery of a Saskatchewan crude," *Journal of Canadian Petroleum Technology,* 30(2), 123-132, March-April 1991. These emulsions were stabilized by soap films created by saponification of acidic hydrocarbon components in the crude oil by sodium hydroxide. The soap films reduced the oil/water interfacial tension, acting as surfactants to stabilize the water-in-oil emulsion. It is well known, therefore, that the stability of such emulsions substantially depends on the use of caustic (e.g., sodium hydroxide) for producing a soap film to reduce the oil/water interfacial tension.

Various studies on the use of caustic for producing such emulsions have demonstrated technical feasibility. However, the practical application of this process for recovering oil has been limited by the high cost of the caustic, likely adsorption of the soap films onto the formation rock leading to gradual breakdown of the emulsion, and the sensitivity of the emulsion viscosity to minor changes in water salinity and water content. For example, because most formations contain water with many dissolved solids, emulsions requiring fresh or distilled water often fail to achieve design potential because such low-salinity conditions are difficult to achieve and maintain within the actual formation. Ionic species can be dissolved from the rock and the injected fresh water can mix with higher-salinity resident water, causing breakdown of the low-tension stabilized emulsion.

Bragg et al., (U.S. Pat. Nos. 5,855,243, 5,910,467, 5,927,404, 6,068,054) describes using a high water-cut water-in-oil emulsion stabilized with microparticles and diluted with dissolved gas to displace viscous oils from subterranean formations. As stated in the '243 patent, these so-called "solid stabilized emulsions" are such that "solid particles are the primary means, but not necessarily the only means, by which the films surrounding the internal phase droplets of an emulsion are maintained in a stable state under formation conditions for a sufficient time to use an emulsion as intended (e.g., enhance rate and/or amount of hydrocarbon production from a formation)."

The method of using a water-in-oil emulsion can be highly effective for certain oils and formations. However, the economics for such methods is typically very sensitive to the stability of the emulsion in situ. This is especially the case for the use of water-in-oil emulsions to displace heavy (viscous) oils. For a water-in-oil emulsion to have a viscosity sufficient to effectively displace a heavy oil, it requires a high concentration of emulsified water—typically >50 volume percent (vol %). Emulsion viscosity generally increases with increasing volume of the internal (emulsified) phase. If the viscosity of the emulsion is significantly less than that of the oil it is displacing, the emulsion will likely finger and channel through the native oil rather than uniformly displacing the native oil and thus lead to poor oil recovery. Thus, if the emulsion breaks down as it flows through the porous media of a reservoir, its viscosity and thus effectiveness will decrease.

A method for generating near-monodisperse droplets in an emulsion by shearing a previously generated emulsion has been disclosed. See T. G. Mason and J. Bibette, "Shear Rupturing of Droplets in Complex Fluids", *Langmuir,* 13, 4600-4613, 1997; C. Mabille, et al., "Rheological and Shearing Conditions for the Preparation of Monodisperse Emulsions", *Langmuir,* 16, 422-429, 2000. However, Mason is not directed to improving emulsion stability and fails to teach the steps of the disclosed method.

A method is disclosed in GB Patent No. 1,365,332 (the '332 patent) for improving the useful life of a cutting oil, which is essentially an oil-in-water emulsion used to lubricate the interface between a work piece and a machine tool. The method involves controlling bacterial infection in the cutting oil by continuously passing the cutting oil through a pasteurization heating system as is recycled through a flow circuit of the machine tool complex. A homogenizer stage may be placed in series with the pasteurization stage to regenerate the emulsion as it degrades through the system. The '332 patent does not disclose methods for improving emulsion stability other than by bacterial reduction nor for generating an emulsion which is not used in a continuous recycle system.

Accordingly, there is a need for a method to produce an emulsion with high stability that can be made economically, and especially is capable of performing under a wide range of subterranean formation conditions, including salinity, temperature, and permeability.

Other relevant material may be found in U.S. Pat. No. 3,149,669; U.S. Pat. No. 4,077,931; U.S. Pat. No. 4,232,739; U.S. Pat. No. 4,966,235; U.S. Pat. No. 4,983,319; and U.S. Provisional Application No. 61/070,156 titled "Viscous Oil Recovery Using Emulsions" filed on Mar. 20, 2008.

SUMMARY

A method of producing an emulsion is provided. The method includes forming an emulsion having a continuous phase component and an internal phase component; and improving the stability of the emulsion. Improving the emulsion stability comprises mechanically stressing the emulsion to rupture at least a portion of the internal phase component to produce a stressed emulsion having a surviving emulsion portion and a broken-out internal phase portion; and shearing the surviving emulsion with at least a portion of the broken-out internal phase portion.

An alternative method of producing an emulsion is provided. The alternative method includes forming an emulsion having a continuous phase component and an internal phase component; and improving the stability of the emulsion. Improving the emulsion stability comprises a once-through process including stressing the emulsion to rupture at least a portion of the internal phase component to produce a stressed emulsion having a surviving emulsion portion and a broken-out internal phase portion; and shearing the surviving emulsion with at least a portion of the broken-out internal phase portion.

A third embodiment of the method of producing an emulsion is provided. The third method includes forming an emulsion having a continuous phase component and an internal phase component mixing the first emulsion with a recycled emulsion to form a second emulsion; and improving the stability of the second emulsion. Improving the stability includes stressing the second emulsion to rupture at least a portion of the internal phase component to produce a stressed emulsion having a surviving emulsion portion and a broken-out internal phase portion, shearing the surviving emulsion with at least a portion of the broken-out internal phase portion to form an improved stability emulsion, and separating the improved stability emulsion into the recycle emulsion and a final stabilized emulsion.

Some additional embodiments of the methods may further include one or more of the following elements: the at least a portion of the broken-out internal phase portion is substantially all of the broken-out internal phase portion of the stressed emulsion; the emulsion is an oil-in-water emulsion or a water-in-oil emulsion; the emulsion is injected into a subterranean formation; the internal phase component comprises droplets and the volume fraction of droplets in the emulsion is greater than 50 volume percent; and/or the internal phase component comprises droplets and the volume fraction of droplets in the emulsion is about 60 volume percent. The method may further include adding solid microparticles to the emulsion to enhance emulsion stability. The stressing step may comprise passing the emulsion through a microfilter, aging the emulsion, heating, or any combination thereof, wherein the microfilter may comprise sintered metal, natural porous rock, or unconsolidated granular material and the microfilter may have an average pore throat size of less than about 20 microns or the microfilter may have an average pore throat size of less than about 7 microns. In the stressing step, the emulsion is aged for from at least about three minutes to at least about 30 minutes. The method may include the step of improving the stability of the emulsion by stressing and reshearing the emulsion is repeated at least once and may further comprise adding water during the at least one repetition. In one embodiment, the emulsion is used as a displacement fluid to displace viscous hydrocarbons from the subterranean formation or the emulsion is used as a plugging fluid to block or divert fluid flow in the subterranean formation. The method may further comprise heating the emulsion prior to or during the stressing step or adding a diluent to the oil portion of the emulsion.

In another alternative embodiment, an apparatus for generating an emulsion is provided. The apparatus includes a high-shear mixer configured to mix an oil component and a water component to form an emulsion fluid; a stressing unit configured to stress the emulsion fluid to form a stressed emulsion fluid, wherein the stressing unit is operatively attached to the high-shear mixer; and a mixing unit configured to shear the stressed emulsion fluid to form at least a final stabilized emulsion fluid, wherein the mixing unit is operatively attached to the stressing unit.

In a fifth embodiment, a method of producing hydrocarbons is provided. The method includes generating an improved stability emulsion, comprising: forming an emulsion having a continuous phase component and an internal phase component; and improving the stability of the emulsion. Improving the emulsion stability comprises stressing the emulsion to rupture at least a portion of the internal phase component to produce a stressed emulsion having a surviving emulsion portion and a broken-out internal phase portion; and shearing the surviving emulsion with at least a portion of the broken-out internal phase portion. The method further includes injecting the improved stability emulsion into a subterranean formation; and using the improved stability emulsion as a drive fluid to displace hydrocarbons from the subterranean formation.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION

Figure 1:
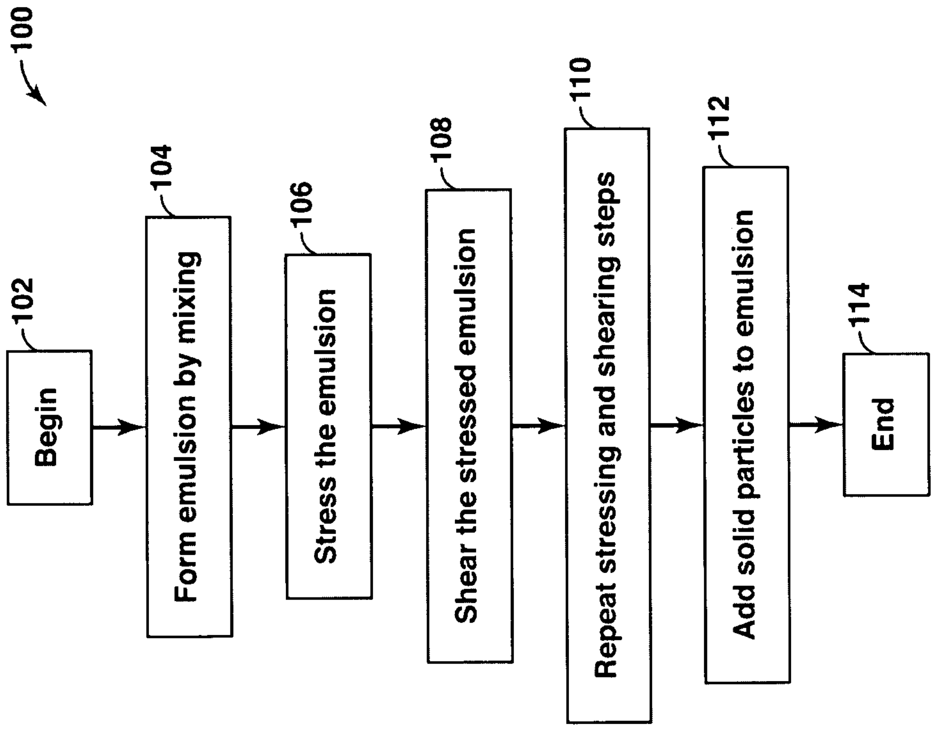
FIG. 1 is an illustrative flow chart of a method of producing an emulsion in accordance with aspects of the present invention.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

As used herein, the term "water" means any aqueous phase fluid, which may include fresh water, salt water, brine, or water having other included contaminants.

As used herein, the term "emulsions" generally refers only to macroemulsions rather than microemulsions. Macroemulsions may be defined as metastable dispersions of two or more liquid phases. Microemulsions may be defined as thermodynamically stable dispersions of two or more liquid phases (e.g., interfacial tension between dispersed phases is zero or nearly zero).

As used herein, the term "stressing the emulsion" generally refers to any procedure rupturing at least a portion of the internal phase component. The procedure is not necessarily a mechanical procedure involving a shear force producing a physical deformation.

According to at least one aspect of the invention, there is provided a method of enhancing the stability of an emulsion. More specifically, the method includes forming an emulsion and improving the emulsion's stability. Improving the emulsion stability includes stressing the emulsion to rupture at least a portion of the internal phase component to generate a "stressed emulsion" which is a mixture of surviving emulsion and broken-out internal phase fluid. After stressing the emulsion, reshearing the surviving emulsion with at least a portion of the broken-out internal phase fluid.

In the method, the emulsion formation may be accomplished using a high-shear mixing unit and the stressing may be accomplished using aging, microfiltration, heating, or some combination thereof on the previously formed emulsion. The high-shear mixing unit may utilize any manner of shearing, for example a rotating blade, a colloid mill, or flow through small holes. Chemical methods to stress the emulsion are in general not preferred. Addition of chemical or biological agents to rupture a portion of the internal phase would require later removal of the agents so not to reduce the stability of the ultimate emulsion to be generated. Removal would likely add significant complexity and cost.

The method may be applied to emulsions with or without added components to improve stability, e.g., surfactants or solid particles. The external phase of the emulsion may include a diluent, e.g., a dissolved gas or low viscosity soluble liquid, to adjust its viscosity and the viscosity of the overall emulsion. In certain embodiments the method is applied to water-in-crude oil emulsions that are injected into subterranean formations to displace and recover viscous hydrocarbons. In certain other embodiments, the method is applied to generate viscous emulsions that are injected into subterranean formations to control the flow of other injected or produced flows by at least partially blocking, plugging or diverting these flows.

Although the present method was motivated for application to enhancing the performance of water-in-oil emulsions to displace viscous hydrocarbons from a subterranean formation, the method is generally applicable to macroemulsions of any phase ordering or type (e.g., oil-in-water, $CO_2$-in-water, oil-in-water-in-oil, etc.). Moreover, the emulsions may be used for any purpose and not just limited to viscous hydrocarbon recovery.

In another aspect of the invention, an apparatus is provided for forming a stabilized emulsion. The apparatus may include a high-shear device configured to form an emulsion, a stressing device for stressing the emulsion, and a second high-shear device to reshear the stressed effluent. In some embodiments, a recycle is used such that the second high-shear device would be the same as the first high-shear device.

Referring now to the figures, FIG. 1 is an exemplary flow chart of a method of producing an emulsion in accordance with aspects of the present invention. The method for enhancing the stability of an emulsion 100 begins at block 102. An emulsion is formed 104 by applying shear to the constituent fluids, then the emulsion is stressed 106 to partially break the emulsion and produce an "stressed emulsion" effluent which is a mixture comprising emulsion and unemulsified internal-phase fluid (i.e., broken-out internal-phase fluid). This stressed emulsion is then mixed or sheared (e.g., resheared) 108 to re-emulsify the broken-out unemulsified fluid. Optionally, the stressing 106 and shearing 108 steps may be repeated once, twice, or more until the emulsion is sufficiently stable. Solid particles may also be added to the emulsion 112 to enhance stability and form a solid stabilized emulsion (SSE) as described in the '243 patent, which is hereby incorporated by reference. The process 100 ends at 114.

In one embodiment, the emulsion is a water-in-oil emulsion. The stability of such an emulsion is enhanced by stressing the emulsion 106 after its generation 104 causing some water (i.e., the internal phase) to break-out and then reshearing (e.g., remixing) 108 the resulting effluent of emulsion and free water to generate a new, more stable emulsion. The process may be repeated 110 several times to further improved stability. However, an asymptotic maximum stability may be reached after just a few cycles. Any oil may be used, but oil having at least one of: (i) greater than five weight percent (wt %) asphaltene content, (ii) greater than two wt % sulfur content, and (iii) less than 22 dyne/cm interfacial tension between the hydrocarbon liquid and the aqueous liquid is preferable if to be used to displace viscous hydrocarbons from a subterranean formation, as discussed in the U.S. Provisional Application No. 61/070,156, titled "Viscous Oil Recovery Using Emulsions" filed on Mar. 20, 2008, which is hereby incorporated by reference.

Two exemplary methods of stressing the emulsion 106 are: (1) to pass the emulsion through a microporous media (e.g., a 2 micron sintered metal filter) or short sand pack (e.g., a 1 inch (2.5 cm) plug of 2.5 Darcy sand), and (2) to age the emulsion (e.g., for several minutes to several hours). The emulsion may optionally be heated during the filtering or aging, which in itself may provide a form of stressing 106 and also may lessen pumping capacity requirements by reducing the emulsion viscosity.

The stressing step 106 followed by reshearing 108 provides for a "survival of the fittest" mechanism. The generated droplets in an emulsion naturally have a random distribution of films strengths. The films, which protect the droplets from coalescence, may comprise natural surfactants (e.g., asphaltenes and naphthenic soaps), solids particles (natural and added), and any added surfactants. Stressing the emulsion 106, such as by microfiltering or reshearing after aging, breaks weak droplets releasing the associated water (i.e., internal phase). This released water then has an opportunity of reform stronger droplets upon reshearing 108. The droplets that do not break upon stressing 106 will largely survive reshearing 108 without being broken, assuming the reshearing 108 is of similar or lesser intensity (e.g., mixer speed or power input per volume of fluid) than that which created the original emulsion 104.

Aging may allow the weakest of droplets to naturally rupture but also permits the components adsorbed on the droplet surfaces which form the surface films to restructure and anneal. Those droplets whose films do not restructure into strong films can break upon reshearing 108 and permit internal water to reform as new droplets that randomly may have a better film strength.

A preferred method for generating water-in-oil emulsions is to blend the water with oil and subject the blend to sufficient shearing/mixing energy 104 to produce water droplets sufficiently small to remain dispersed and stabilized in the oil. For water-in-oil emulsions used to displace viscous hydrocarbons from a subterranean formation preferably the emulsion is composed of less than 50 volume percent (vol %) of the selected hydrocarbon liquid and greater than 50 vol % of the aqueous liquid. Moreover, preferably greater than 90 vol % of the produced droplets have diameters less than 20 microns.

The order and manner of mixing can have a significant effect on the properties of the resulting emulsion. For example, high-water-content oil-external emulsions are best produced by adding the water to the oil rather than adding oil to water. Water may be added to the oil to increase its concentration in small increments, with continuous shearing, until the total desired water content is reached.

To practice the current invention a stressing step 106 may be added between one or more stages of shearing. A stressing step 106 may include passing the fluids through a microporous filter composed of, for example, sintered metal, packed granular material, or fine mesh. Alternatively or in conjunction, a stressing step may include sending the fluids to an aging unit, which may comprise a tank or an extended length of piping to add residence (aging) time to the process. The aging period is such that a non-negligible volume fraction (e.g., >0.5%) of an internal phase ruptures and separates into a free phase. Preferred aging times may range from less than three minutes to about 30 minutes, to about three hours or more. Heating may be provided in conjunction with the stressing step. Heating the emulsion to lower its viscosity may be particularly advantageous so as to reduce required pumping power if the emulsion is to be stressed by passing it through a microporous filter. Moreover, heating in itself may provide a means of stressing the emulsion 106 and cause weaker droplets to rupture.

The shearing stages may be set-up in a once-through configuration or may be set-up with a recycle. When a recycle is used, a portion of the flow after a stressing step 106 may be sent back to a previous mixing step 108.

Preferably for emulsions used to displace viscous hydrocarbons from a subterranean formation, the emulsion's oil is comprised of hydrocarbons previously produced from the formation where the emulsion is to be used. The emulsions disclosed herein are preferably used to recover moderately viscous or heavy oils (e.g., about 20 centipoise to about 3,000 centipoise).

The water used for making the emulsion should have sufficient ion concentration to keep the emulsion stable under formation conditions. Preferably, formation water is used to make the emulsion. However, fresh water could be used and the ion concentration adjusted as needed for stabilizing the emulsion under formation conditions.

The emulsion stability may be additionally enhanced by the addition of surface active agents. These agents may include surfactant chemicals, microparticles, or asphaltenic oil components.

The methods for enhancing the stability of an emulsion 100 disclosed herein can be used for a variety of applications. One particularly useful application is to aid emulsions used as drive fluids to displace oils too viscous to be recovered efficiently by waterflooding in non-thermal (or "cold flow") or thermal applications.

Figure 2:
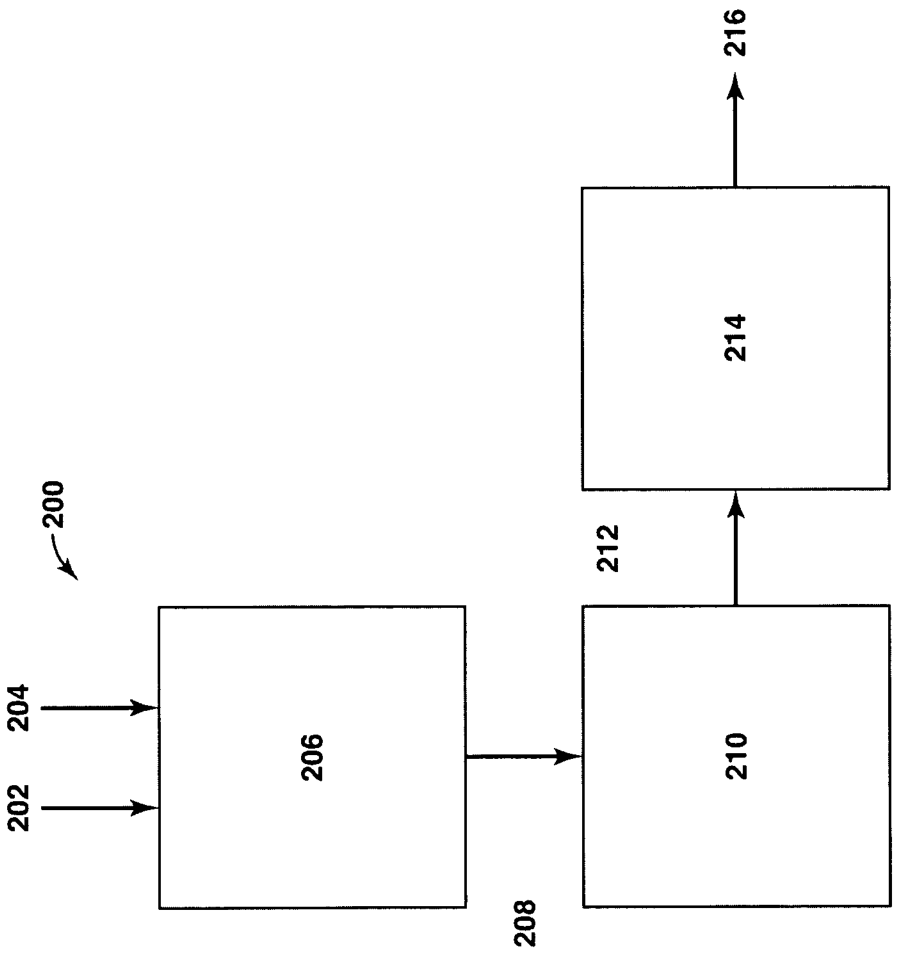
FIG. 2 is an illustration of an apparatus for improving emulsion stability in accordance with the method of FIG. 1.

In FIG. 2, an illustration of an apparatus for improving emulsion stability in accordance with the method of FIG. 1 is shown. Hence, FIG. 2 may be best understood with reference to FIG. 1. The apparatus 200 includes a mixer 206 for forming an emulsion 104 from two fluids 202 and 204. The mixer has an emulsion outlet 208 for delivering the resulting emulsion from the mixer 206 to a stressing unit 210 configured to generate a stressed emulsion 106. The stressing unit 210 has a stressed emulsion outlet 212 for delivering the stressed emulsion to a remixing unit 214, which shears the stressed emulsion 108 to produce a stabilized emulsion via a stabilized emulsion outlet 216.

In one particular embodiment, the fluids 202 and 204 may be oil and water. In some embodiments, the stressing unit 210 is an aging unit and in other embodiments, the stressing unit 210 is a filtering unit, such as a microfilter, which may comprise sand, sintered metal, porous rock, or other filtering medium. Such a filter may have an average pore throat size of less than about 20 microns, less than about 10 microns, or less than about 5 microns. While FIG. 2 depicts the remixing unit 214 as separate from the mixer 206, it may be the same unit in some embodiments. In one alternative embodiment, a portion of the stressed emulsion outlet 212 may feed to a separate reshearing (e.g., remixing) unit 214, with the remaining portion of the stressed emulsion is recycled to the original mixing unit 206.

Figure 3A:
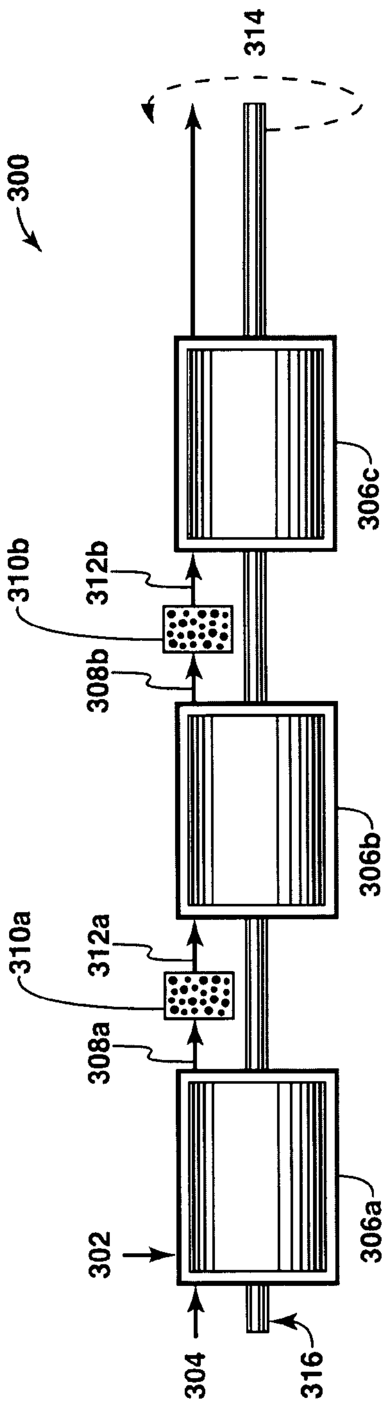
FIGS. 3A-3D are exemplary illustrations of four alternative embodiments of the apparatus of FIG. 2 as utilized in the process of FIG. 1.
Figure 3B:
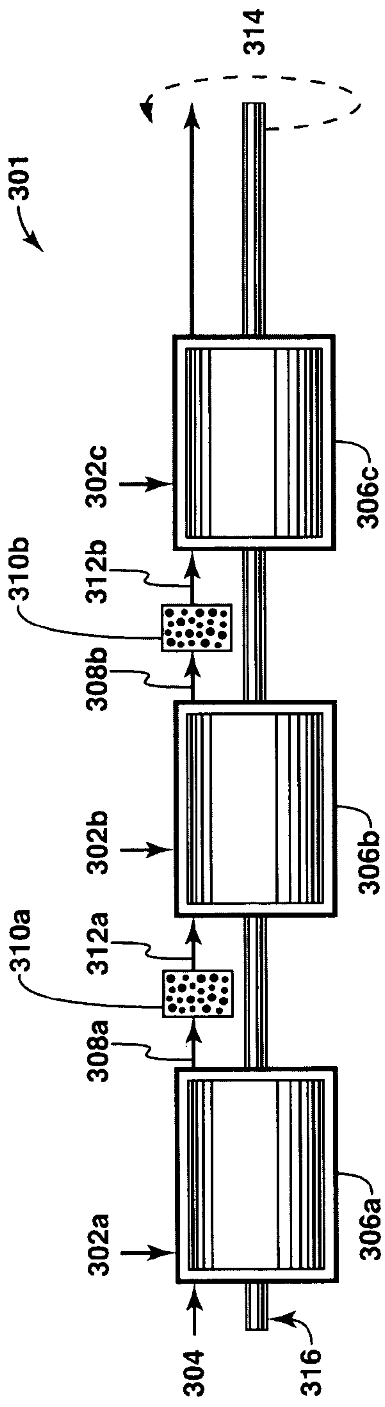
Figure 3C:
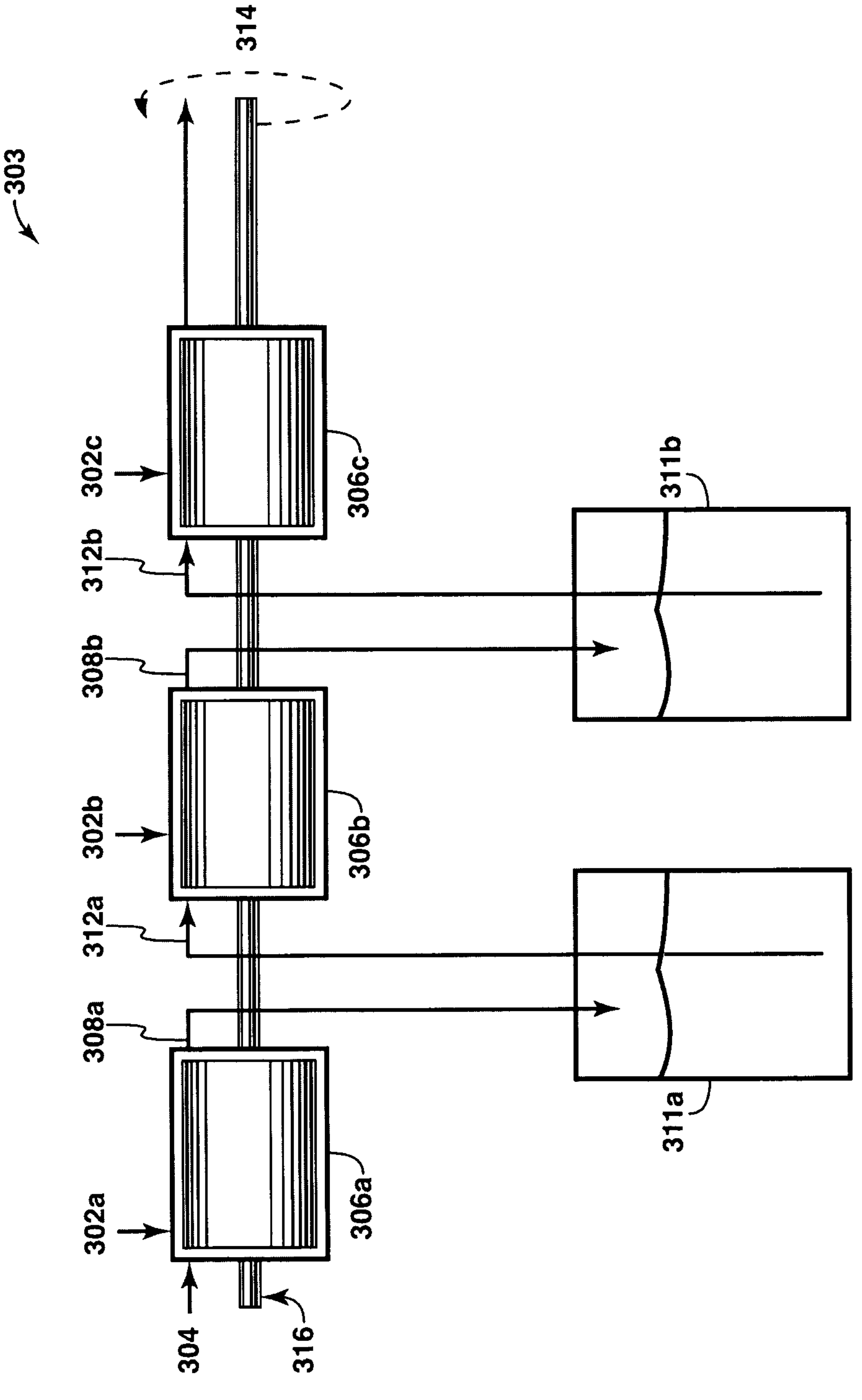
Figure 3D:
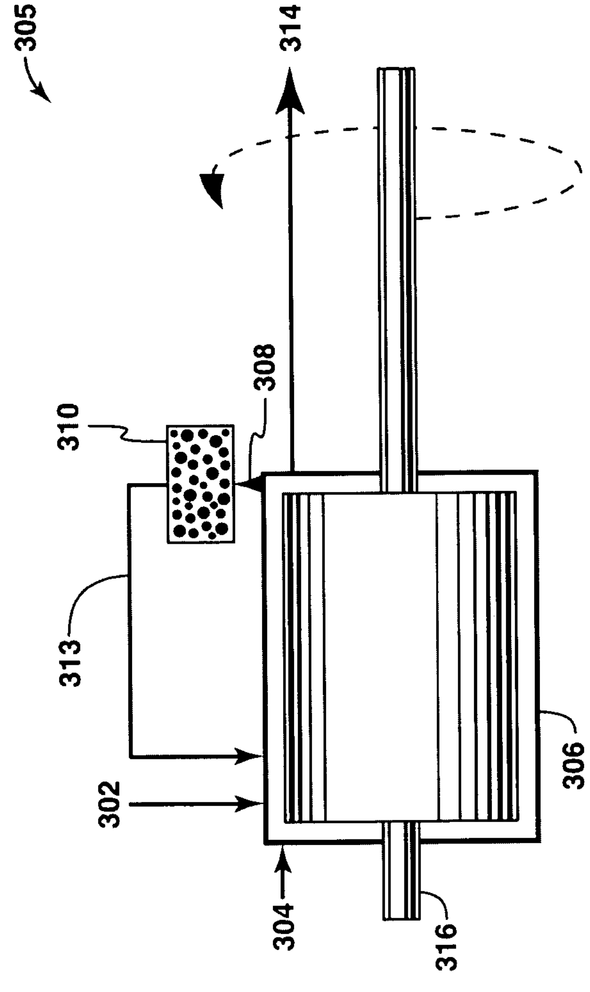

FIGS. 3A-3D are exemplary illustrations of four alternative embodiments of the apparatus of FIG. 2 as utilized in the process of FIG. 1. FIGS. 3A-3C depict once-through processes whereas FIG. 3D depicts a process with recycle. FIGS. 3A-3D may be best understood with reference to FIGS. 1 and 2. In this embodiment, the apparatus 300 comprises a water inlet stream 302, an oil inlet stream 304 into a first mixing unit 306*a* to form an emulsion 104. The first exit stream 308*a* carries the emulsion from the first mixing unit 306*a* to a first filter unit 310*a* to stress the emulsion 106 to generate a first stressed emulsion stream 312*a*. The first stressed emulsion stream 312*a* is fed into the second mixing unit 306*b* to shear the stressed emulsion 108, producing a second exit stream 308*b* into the second filter unit 310*b*. From the second filter unit 310*b*, a second stressed emulsion stream 312*b* is produced and sent to a third mixing unit 306*c*, which produces a final emulsion product stream 314.

In this particular embodiment of the apparatus 300, all of the water 302 is injected in the first mixing unit 306 and the three mixing units 306*a*-306*c* are colloid mills with cylinders connected to a rotating shaft 316. The cylinders are housed in drums sized to have narrow gaps between the inside of the drum and the rotating cylinder. Although colloid mills 306*a*-306*c* are depicted, it is understood that other mixing units known in the art, such as rotating blades and nozzles, may be used to generate the final emulsions product stream 314. It should also be noted that although three mixing units 306*a*-306*c* are shown, the disclosure is not limited to three mixing units and may include four to six units or more mixing units.

The filtering units 310*a*-310*b* may be a microfilter, which may comprise sand, sintered metal, porous rock, or other filtering medium. Such a filter may have an average pore throat size of less than about 20 microns, less than about 10 microns, or less than about 5 microns.

FIG. 3B is an alternative exemplary embodiment of the apparatus of FIG. 2. Apparatus 301 is similar to apparatus 300 and to the extent the numerical indicators are the same, the device may be considered to have the same description. Apparatus 301 includes multiple water stream inlets 302*a*-302*c* indicating that only a portion of the total water injected is injected into each mixer 306*a*-306*c*.

FIG. 3C is an alternative exemplary embodiment of the apparatus of FIG. 2. Apparatus 303 is similar to apparatus 301, but replaces the filters 310*a*-310*b* with aging tanks 311*a*-311*b*. The tanks 311*a*-311*b* are used to stress the emulsion fluid 106 and provide residence time, which may vary from less than three minutes to about thirty minutes to about three hours, depending on the type of emulsion, application, and other operational constraints. Note that although three separate water inlets 302*a*-302*c* are shown, the apparatus 303 may include only one water inlet 302 similar to the apparatus 300.

FIG. 3D is an alternative exemplary embodiment of the apparatus of FIG. 2. Apparatus 305 includes only one mixing unit 306 and one water inlet 302 and oil inlet 304. Rather than sending the emulsion through three separate mixing units 306*a*-306*c*, the stressed fluid stream 313 is recycled back into the mixing unit 306. In this embodiment, the recycled stream 313 is the portion of the stressed emulsion that requires remixing in the mixing unit 306, while the remainder of the stream is a final emulsion fluid 314. Although a filter 310 is shown, an aging unit such as aging unit 311*a* may be used to stress the emulsion.

For field application to displace viscous hydrocarbons from a subterranean formation, it is preferable to use a continuous system to generate the emulsion such as in apparatuses 300, 301, and 303. Such a system may utilize flow through narrow gaps adjacent to rotating surfaces (e.g., colloid mills), bladed stirrers, or high-pressure nozzles (e.g., homogenizers). Emulsion quality is generally improved by using several stages of emulsion generation (e.g., several mixers in series) where water is added at more than one stage such as in apparatus 301. In some embodiments, the emulsion is generated in the staged continuous mixer 301 where less than 60 vol % of the total aqueous liquid is added in any one stage (e.g., 302*a*, 302*b*, or 302*c*). In other embodiments, the emulsion is generated in a staged continuous mixer 301 where less than 40 vol % of the total aqueous liquid is added in any one stage.

One typical application is using the final emulsion fluid 314 for displacing viscous oil (e.g., 100 to about 10,000 cp) from a formation under ambient formation temperature (e.g., from about 10 to about 120° C.). An oil-external emulsion 314 applied in such conditions generally yields an emulsion with a lower mobility (or viscosity) than that of the crude oil being displaced.

One exemplary application of the present inventions is in producing oil from subterranean formations having rock with an absolute permeability sufficiently high to allow individual emulsion droplets to pass through the rock pores unimpeded. The lower limit on permeability is thus dependent not only on the rock pore structure, but also on the droplet size distribution in the emulsion. For many viscous oil applications, rock permeability is not expected to be a limiting factor. For example, many formation rocks containing heavy oil deposits have an absolute permeability of from about 2,000 to about 15,000 millidarcies (md) or from about 5,000 to about 10,000 md. Such rocks have pore throats with average diameters of from approximately 20-200 microns. Droplet sizes in emulsions injected into these rocks are likely to range in diameter from less than about 1.0 microns to about 15 microns, thus the droplets should not be impeded in flow through such rocks. However, small droplet diameters are preferred to reduce the possibility of trapping of the internal phase.

The lower limit of rock permeability to allow flow of a specific emulsion can be determined in laboratory tests by flowing said emulsion through a series of rocks of decreasing, but known, absolute permeability. Procedures for conducting such core flow tests are known to those skilled in the art, but involve measuring pressure drops across a core at measured flow rates and determining whether the emulsion is trapped within the rock pores or passes unimpeded through the rock. An exact lower limit for application of such emulsions has not yet been established, but is believed to be below 1,000 md for emulsions having average droplet diameters of less than approximately 5 microns. Such core flood tests conducted in rock representative of the target formation are currently the best method for determining whether the droplet size distribution of the emulsion is sufficiently small to allow emulsion flow without trapping of droplets at pore throats. If such core flood tests suggest that trapping is occurring, applying additional shearing energy to further reduce average droplet size when formulating the emulsion 314 may mitigate or avoid the problem.

In one alternative embodiment of the present invention, a diluent may be added to the oil to adjust the emulsion's viscosity. The diluents may be low viscosity hydrocarbon liquids (e.g., condensate, high API gravity oils, diesel, etc.) or oil-soluble gases (e.g., natural gas, carbon dioxide, methane, ethane, propane, butane, etc.). Typically for large-scale applications, dilution by gas addition is more economic than dilution by liquid hydrocarbon addition.

It should be noted that the viscosity of oil-external (i.e., water-in-oil) emulsions is always higher than the viscosity of the base oil used to form the external phase. When the emulsion is used as a drive fluid to displace oil from a reservoir, the most efficient oil recovery is obtained when the water content of the emulsion is high, for example 50 volume percent (vol %) water or higher. At such water contents, the viscosity of the emulsion may be approximately 10-fold to 20-fold higher than the viscosity of the oil used to form the emulsion. If the oil used to form the emulsion has the same viscosity as the oil in the reservoir being displaced by the emulsion flood, the emulsion viscosity will be higher than needed for efficient flood performance.

To achieve efficient oil displacement in a reservoir flood, the mobility (or viscosity) of the emulsion drive fluid preferably should be equal to or less than the mobility of the oil being displaced. As noted above, mobility of the fluid may be defined as the ratio of fluid relative permeability to fluid viscosity. The relative permeability of the oil being displaced or of the emulsion containing a fixed water content will depend on the rock properties such as lithology, pore size distribution, and wettability. These parameters are naturally governed by the fluid-rock system, and cannot normally be adjusted. However, the viscosity of an emulsion can be readily adjusted to control its mobility by adding diluent or adjusting the volume fraction of the internal phase. An emulsion viscosity that is higher than needed to achieve this mobility ratio will still provide very efficient oil displacement, but may lead to higher pumping costs and a longer flood life, both of which reduce the economic profitability of the process.

One method for adjusting the viscosity of an oil-external emulsion is to add a gas that is soluble in the oil phase (the continuous or external phase) of the emulsion and reduces its viscosity. Adding hydrocarbon gases such as methane, ethane, propane, butane, or natural gas mixtures can produce reductions in oil viscosity. However, other gases such as carbon dioxide can be especially efficient in reducing oil viscosity at only modest concentrations. The emulsion viscosity therefore can be reduced by incorporating a gas into the emulsion. Generally, a sufficient amount of gas should be added to reduce the emulsion's viscosity to less than about ten times (more preferably, less than about six times) the viscosity of the oil being recovered. This can be achieved by saturating the emulsion with gas at a pressure necessary to achieve the desired equilibrium concentrations in both the oil and water phases of the emulsion.

In the field, the gas can be added to the oil and water prior to mixing the emulsion 104, or alternately the emulsion can be blended 104 prior to adding the carbon dioxide. Addition of gas to the oil and water prior to blending 104 the emulsion has the added benefit of reducing the viscosity of fluids during blending, thus reducing needed mixing energy. Gas can be added to the fluids using any of a number of mechanical mixing methods known to those skilled in the art. For example, the gas can be injected into the fluid upstream of a high-shear mixing device 206 maintained at a pressure equal to or greater than the gas saturation pressure, or the gas can be mixed into the fluid in a counter-current absorption tower operated at the desired pressure. Regardless of means used for mixing, the pressure within surface facilities needed to incorporate the desired amount of gas will generally be much less than pressures the emulsion will subsequently encounter within injection lines, injection wells, or the oil reservoir. Therefore, the gas will remain dissolved in the emulsion over most or all of its useful lifetime, providing stable viscosity adjustment of the process.

In the context of the present invention, the diluent is preferably added to the oil prior to generating the original emulsion 104. However, the diluent or additional diluent may be added at subsequent stages of the emulsion generation and stability enhancement.

EXPERIMENTAL RESULTS

Laboratory experiments were performed to test the benefits of the disclosed method. Emulsion stability was tested by passing a small sample of a stabilized emulsion through a sandpack by means of a centrifuge. In particular, the tests utilized emulsions of 32 volume percent (vol %) crude oil/8 vol % n-decane/60 vol % brine (3 wt % salt).

Decane was use to reduce the emulsion viscosity to about twice that of the undiluted oil. The emulsions were made using a benchtop Silverson™ mixer running at high speed. Brine was added slowly over the course of about 10 minutes. Some emulsions studied included 0.5 grams per liter (g/l) of oil-wetting Aerosil™ R972 fumed silica from Evonik Degussa.

Figure 4:
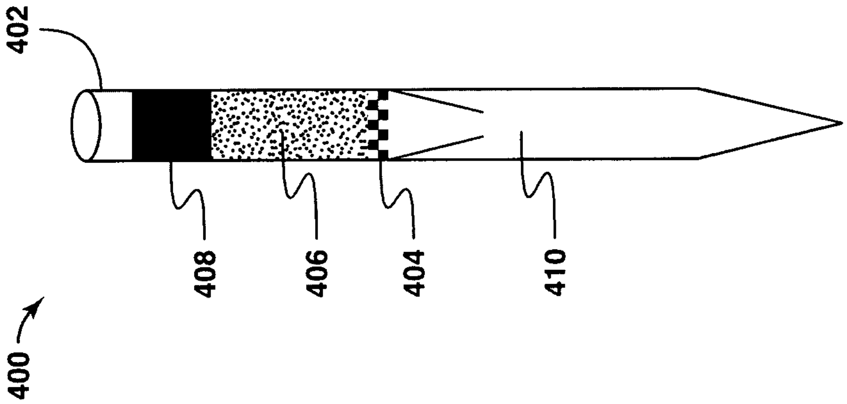
FIG. 4 is an exemplary schematic of the setup of a centrifuge tube as used in the micro-filtration experiment.

FIG. 4 is an exemplary schematic of the setup of the centrifuge tubes as used in the experiment outlined above. In the setup 400, a 15 milliliter (ml) transparent plastic tube 402 was used. The tube 402 includes a highly porous plug 404 set in the taper of the tube 402. Sand 406 was then placed on top of the plug 404. Emulsion 408 was placed on the sand 406. Once the setup was complete, the emulsion 408 was tested by spinning the tube 402 in a centrifuge (not shown) to cause the emulsion 408 to flow through the sand 406 and the plug 404 into the fluid collection portion 410 of the tube 402.

The tests were run at room temperature. The centrifuge ran at about 2,600 revolutions per minute (rpm) inducing a centrifugal force equivalent to about 900 times that of gravity. The centrifuge tests included passing about 4 cubic centimeters ($cm^3$) of unpressurized water-in-oil emulsion through about 4 cm of packed sand. The sand pack typically had a permeability of about 4 Darcy with 35-40% porosity. The crude oil employed was a Canadian crude oil with a viscosity of about 2,500 cp at 20 degrees Celsius (° C.).

Tests verified that the porous plug 404 had no measurable effect on the emulsion 408. Any water that broke out of the emulsion 408 collected in the bottom of the taper 410, being denser than the oil used. The amount of water was read off visually. Tests were run until the amount of water collected was stable, typically 2 to 4 hours. The greater the amount of water separated from the emulsion 408 as it passed through the porous medium, the less stable the emulsion thus indicating reduced effectiveness as a displacement agent for recovering viscous oil from a reservoir.

Figure 5:
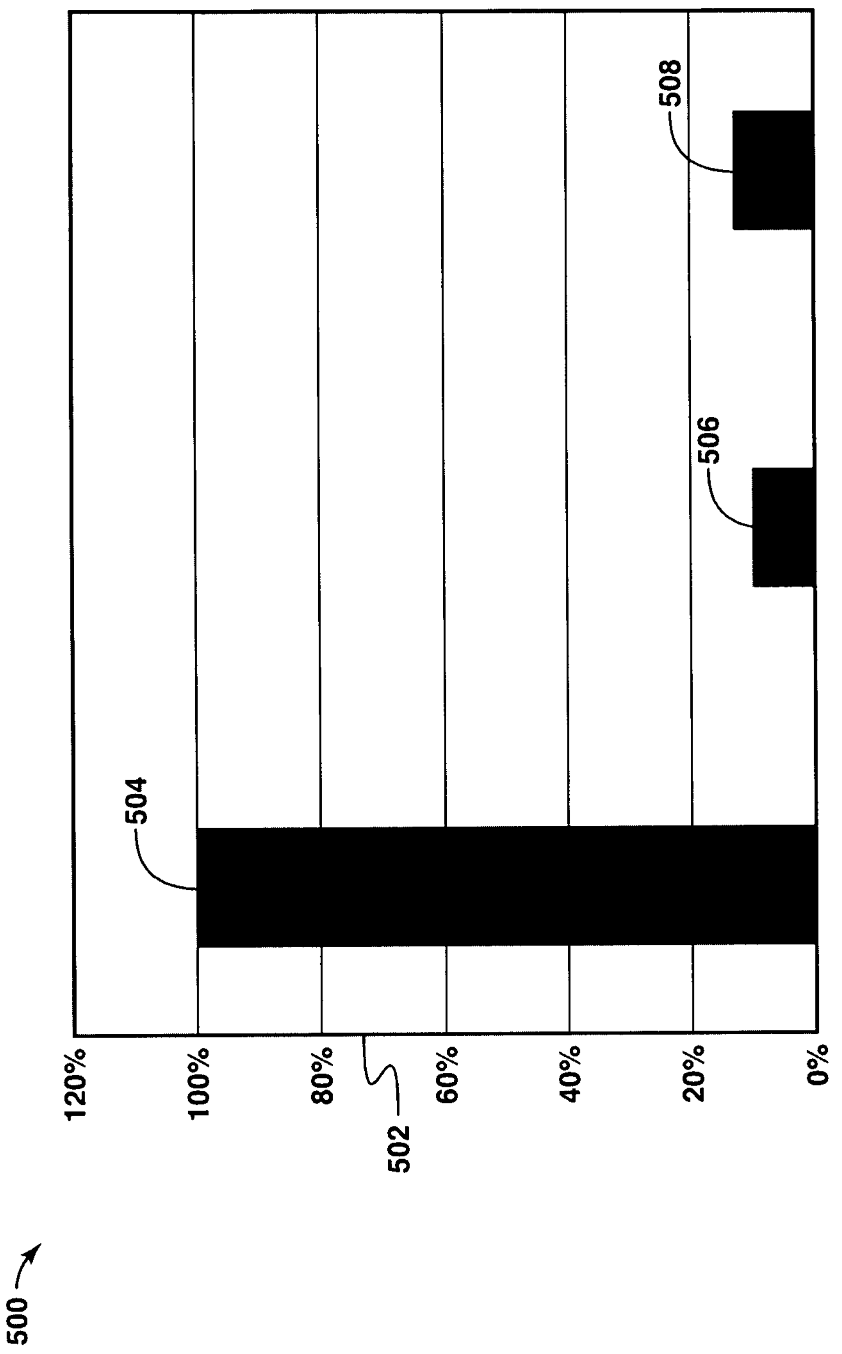
FIG. 5 shows a graph of emulsion stability test results where emulsions were generated, filtered and then remixed three times.
Figure 6:
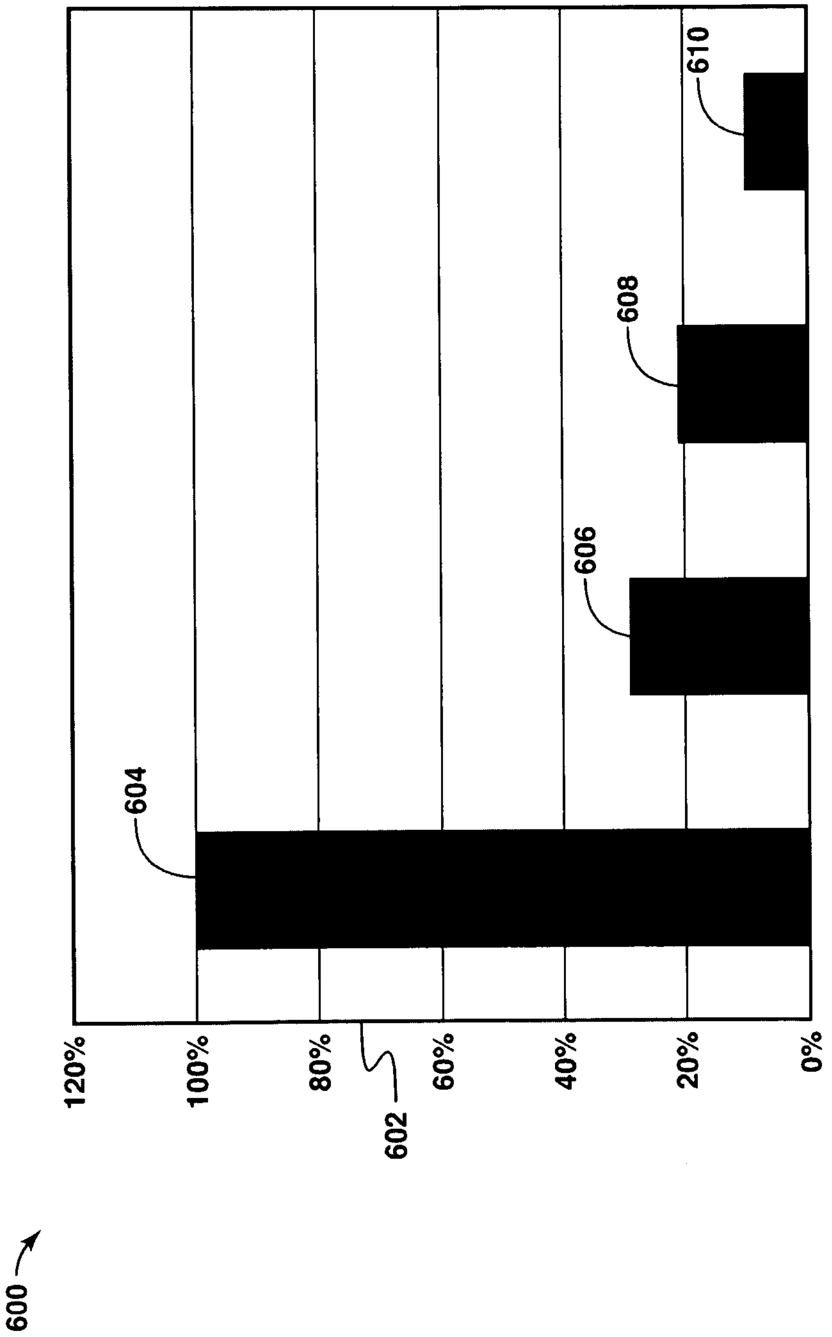
FIG. 6 shows a graph of emulsion stability test results where emulsions were generated, filtered and then remixed only once.
Figure 7:
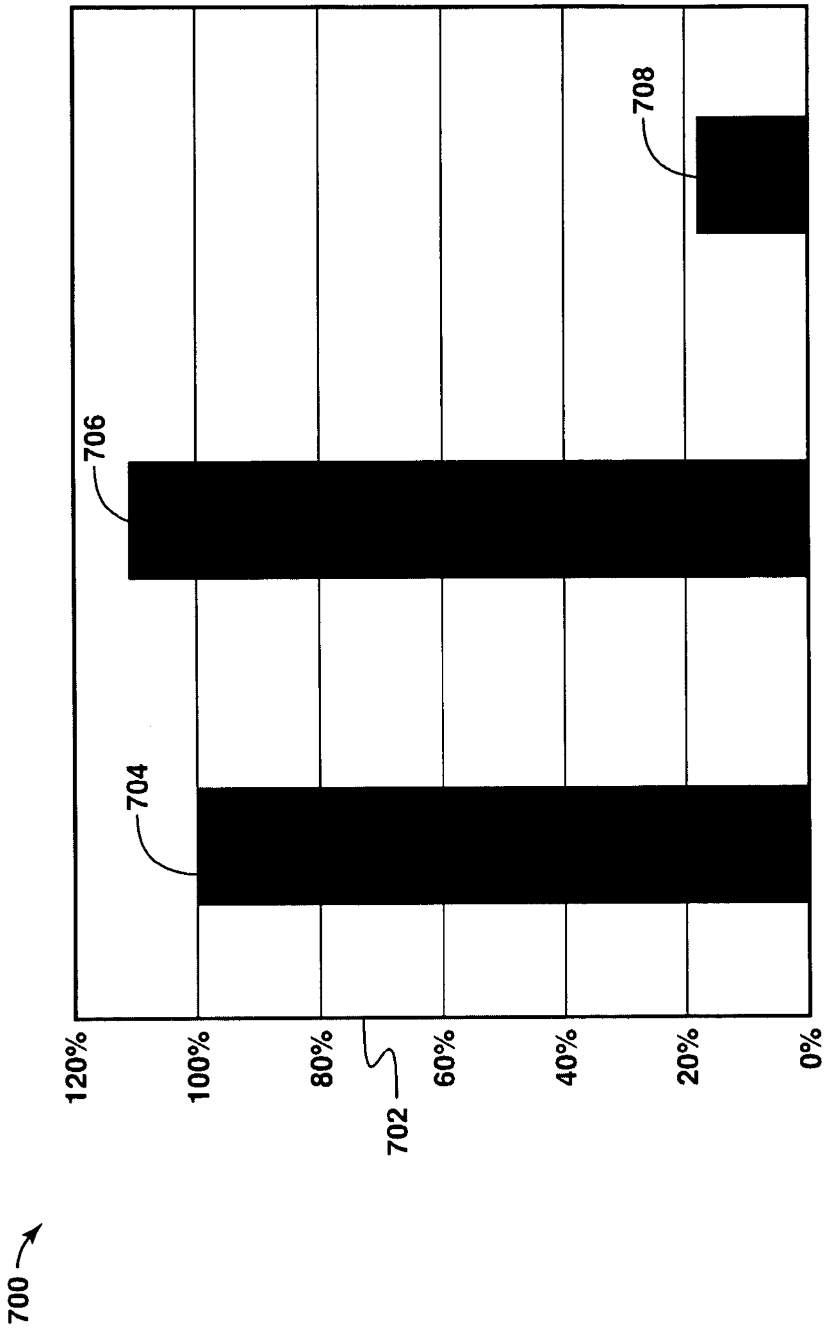
FIG. 7 shows a graph of emulsion stability test results where emulsions were generated, aged and then remixed.

FIGS. 5-7 are graphs of data gathered using the experimental apparatus of FIG. 4 and associated steps. As such, FIGS. 5-7 may be best understood with reference to FIG. 4. FIG. 5 shows a graph 500 of emulsion stability test results where emulsions were generated, filtered (stressed) and then remixed three times (e.g., generated-filtered-remixed-filtered-remixed-filtered-remixed). The scale on the left 502 shows the water breakout as a percentage of the water added to make the emulsion relative to the untreated base case 504. Bar 504 is the base emulsion having no stability treatment, bars 506 and 508 show the amount of water breakout relative to the base case for two stability-enhanced emulsions made using alternative embodiments of the inventive methods disclosed herein.

The emulsions shown in FIG. 5 were generated with 0.5 g/l of Evonik Degussa R972™ fumed silica added. The emulsion shown with bar 506 was filtered using a 0.5 micron microporous sintered metal filter. The emulsion shown with bar 508 was filtered using a 2 inch (5 cm) sand pack with 2.5 Darcy permeability. The filtering was performed by pumping the emulsion through the filter using a low-shear syringe pump. The pump by itself was known not to affect the nature of the emulsion. The graph 500 shows that relative to the base case unfiltered emulsion 504, both triple-filtered emulsions 506 and 508 exhibited approximately an order of magnitude improvement in stability (i.e., reduction in water breakout 502). Note that relative performance is reported in FIG. 5, however for reference it is noted that the base case 504 exhibited break out of about 7% of the originally emulsified water volume. By contrast, each of the treated emulsions 506, 508 exhibited breakout of less than 1% of the originally emulsified water volume.

FIG. 6 shows a graph 600 similar to graph 500. The results shown on graph 600 are for a case where the emulsion was filtered and then remixed only once. No added solids were used. The base case 604 was not filtered. The emulsion shown by bar 606 was filtered through a 0.5 micron filter, the emulsion shown by bar 608 was filtered through a 2 micron filter, and the emulsion shown by bar 610 was filtered through a 7 micron filter. Like in FIG. 5, significant improvements in emulsion stability are observed. The variation in quality of the emulsion with filter pore size suggests that the filter pore size may be optimized to minimize the number of filter-remix cycles and to maximize the ultimate emulsion stability.

FIG. 7 shows a graph 700 similar to graphs 500 and 600, but the stressing of the emulsions was done by aging rather than filtering. No added solids were used in this case. Three cases are shown: (1) relative water breakout for a freshly made emulsion (the base case) 704, (2) relative water breakout for an emulsion aged 24 hours 706, and (3) relative water breakout for an emulsion aged 24 hours and then remixed 708. Only the aged, remixed emulsion 708 exhibited improved stability, which was approximately a 6-fold improvement in emulsion stability over the base case 704.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A method of producing a macroemulsion, comprising:

forming a macroemulsion having a continuous liquid phase component and an internal liquid phase component; and improving the stability of the macroemulsion, comprising:

mechanically stressing the macroemulsion to rupture at least a portion of the internal phase component to produce a stressed macroemulsion having a surviving macroemulsion portion and a broken-out internal phase portion, wherein the stressing is performed by passing the macroemulsion through a microfilter; and shearing the surviving macroemulsion with at least a portion of the broken-out internal phase portion to form an improved stability macroemulsion.

2. A method of producing a macroemulsion, comprising:

forming a macroemulsion having a continuous liquid phase component and an internal liquid phase component; and improving the stability of the macroemulsion, comprising a once-through process of:

stressing the macroemulsion to rupture at least a portion of the internal phase component to produce a stressed macroemulsion having a surviving macroemulsion portion and a broken-out internal phase portion, wherein the stressing is performed by a process selected from the group consisting of passing the macroemulsion through a microfilter, aging the macroemulsion, heating the macroemulsion, and any combination thereof; and shearing the surviving macroemulsion with at least a portion of the broken-out internal phase portion to form an improved stability macroemulsion.

3. A method of producing a macroemulsion, comprising:

forming a first macroemulsion having a continuous liquid phase component and an internal liquid phase component;

mixing the first macroemulsion with a recycled emulsion to form a second macroemulsion; and improving the stability of the second macroemulsion, comprising the steps of:

a) stressing the second macroemulsion to rupture at least a portion of the internal phase component to produce a stressed macroemulsion having a surviving macroemulsion portion and a broken-out internal phase portion, wherein the stressing is performed by a process selected from the group consisting of passing the second macroemulsion through a microfilter, aging the second macroemulsion, heating the second macroemulsion, and any combination thereof;

b) shearing the surviving macroemulsion with at least a portion of the broken-out internal phase portion to form an improved stability macroemulsion; and c) separating the improved stability macroemulsion into the recycle macroemulsion and a final stabilized macroemulsion.

4. The method of claim 1, wherein the at least a portion of the broken-out internal phase portion is substantially all of the broken-out internal phase portion of the stressed macroemulsion.

5. The method of claim 1, wherein the macroemulsion is an oil-in-water emulsion or a water-in-oil emulsion.

6. The method of claim 1, further comprising injecting the improved stability macroemulsion into a subterranean formation.

7. The method of claim 3, wherein the final stabilized macroemulsion is injected into a subterranean formation.

8. The method of claim 1, wherein the internal phase component comprises droplets and the volume fraction of droplets in the macroemulsion is greater than 50 volume percent.

9. The method of claim 1, wherein the internal phase component comprises droplets and the volume fraction of droplets in the macroemulsion is about 60 volume percent.

10. The method of claim 1, further comprising adding solid microparticles to the macroemulsion to enhance emulsion stability.

11. The method of claim 1, wherein the microfilter comprises sintered metal, natural porous rock, or unconsolidated granular material.

12. The method of claim 11, wherein the microfilter has an average pore throat size of less than about 20 microns.

13. The method of claim 11, wherein the microfilter has an average pore throat size of less than about 7 microns.

14. The method of claim 2, wherein the macroemulsion is aged for from about three minutes to about 30 minutes prior to shearing the surviving macroemulsion with at least a portion of the broken-out internal phase portion.

15. The method of claim 3, wherein the second macroemulsion is aged for from about three minutes to about 30 minutes prior to shearing the surviving macroemulsion with at least a portion of the broken-out internal phase portion.

16. The method of claim 1, wherein the step of improving the stability of the macroemulsion by stressing and reshearing the macroemulsion is repeated at least once.

17. The method of claim 3, wherein the step of improving the stability of the second macroemulsion by stressing and reshearing the second macroemulsion is repeated at least once.

18. The method of claim 16, further comprising adding water during the at least one repetition.

19. The method of claim 6, further comprising using the improved stability macroemulsion as a displacement fluid to displace viscous hydrocarbons from the subterranean formation.

20. The method of claim 7, further comprising using the final stabilized macroemulsion as a displacement fluid to displace viscous hydrocarbons from the subterranean formation.

21. The method of claim 6, further comprising using the improved stability macroemulsion as a plugging fluid to block or divert fluid flow in the subterranean formation.

22. The method of claim 7, further comprising using the final stabilized macroemulsion as a plugging fluid to block or divert fluid flow in the subterranean formation.

23. The method of claim 1, further comprising heating the macroemulsion prior to or during the stressing step.

24. The method of claim 3, further comprising heating the second macroemulsion prior to or during the stressing step.

25. The method of claim 4, further comprising adding a diluent to the oil portion of the macroemulsion.

26. The method of claim 25, wherein the diluent is a hydrocarbon liquid or a gaseous substance.

27. A method of producing hydrocarbons, comprising:

generating an improved stability emulsion utilizing the method of claim 1;

injecting the improved stability emulsion into a subterranean formation; and using the improved stability emulsion as a drive fluid to displace hydrocarbons from the subterranean formation.

28. A method of producing hydrocarbons, comprising:

generating an improved stability emulsion utilizing the method of claim 2;

injecting the improved stability emulsion into a subterranean formation; and using the improved stability emulsion as a drive fluid to displace hydrocarbons from the subterranean formation.

29. A method of producing hydrocarbons, comprising:

generating an improved stability emulsion utilizing the method of claim 3;

injecting the improved stability emulsion into a subterranean formation; and using the improved stability emulsion as a drive fluid to displace hydrocarbons from the subterranean formation.

30. The method of claim 2, further comprising injecting the improved stability macroemulsion into a subterranean formation.

31. The method of claim 2, wherein the internal phase component comprises droplets and the volume fraction of droplets in the macroemulsion is greater than 50 volume percent.

32. The method of claim 3, wherein the internal phase component comprises droplets and the volume fraction of droplets in the macroemulsion is greater than 50 volume percent.

33. The method of claim 2, further comprising adding solid microparticles to the macroemulsion to enhance emulsion stability.

34. The method of claim 3, further comprising adding solid microparticles to the macroemulsion to enhance emulsion stability.

35. The method of claim 17, further comprising adding water during the at least one repetition.

36. The method of claim 2, further comprising heating the macroemulsion prior to or during the stressing step.

* * * * *